(12) United States Patent
Rangarajan et al.

(10) Patent No.: US 11,792,092 B2
(45) Date of Patent: Oct. 17, 2023

(54) NETWORK TELEMETRY

(71) Applicant: Arista Networks, Inc., Santa Clara, CA (US)

(72) Inventors: Vijay Rangarajan, Bangalore (IN); Hugh Holbrook, Palo Alto, CA (US)

(73) Assignee: Arista Networks, Inc., Santa Clara, CA (US)

( * ) Notice: Subject to any disclaimer, the term of this patent is extended or adjusted under 35 U.S.C. 154(b) by 114 days.

(21) Appl. No.: 17/469,264

(22) Filed: Sep. 8, 2021

(65) Prior Publication Data
US 2022/0294711 A1 Sep. 15, 2022

(30) Foreign Application Priority Data
Mar. 9, 2021 (IN) .............................. 202141009825

(51) Int. Cl.
*H04L 43/022* (2022.01)
*H04L 69/22* (2022.01)
*H04L 43/02* (2022.01)

(52) U.S. Cl.
CPC .................................. *H04L 43/02* (2013.01)

(58) Field of Classification Search
CPC ....... H04L 43/022; H04L 43/02; H04L 49/22; H04L 2212/00
See application file for complete search history.

(56) References Cited

U.S. PATENT DOCUMENTS

| 6,873,600 | B1 * | 3/2005 | Duffield | H04L 43/50 370/252 |
| 7,243,204 | B2 * | 7/2007 | Citron | G06F 12/0802 711/171 |
| 7,957,315 | B2 | 6/2011 | Duffield et al. | |
| 8,077,990 | B2 * | 12/2011 | Islam | H04N 19/154 382/233 |
| 8,719,938 | B2 * | 5/2014 | Chasko | H04L 63/1491 713/189 |
| 9,967,183 | B2 * | 5/2018 | Ashwood-Smith | H04L 45/34 |
| 2003/0210702 | A1 * | 11/2003 | Kendall | H04L 69/161 370/466 |

(Continued)

FOREIGN PATENT DOCUMENTS

EP 3745278 A1 12/2020

OTHER PUBLICATIONS

"Duffield et al., Trajectory Sampling for Direct Traffic Observation, Jun. 2001, IEEE/ACM transactions on Networking, vol. 9, No. 3, pp. 280-292" (Year: 2001).*

(Continued)

*Primary Examiner* — Rasheed Gidado
(74) *Attorney, Agent, or Firm* — Treyz Law Group, P.C.; Tianyi He

(57) ABSTRACT

A networking system may include one or more network nodes such as one or more network switches. The network switches include respective matching engines. The matching engines across the network switches may be configured to match on a consistent set of matching criteria based on low and high entropy data fields to sample a same subset of packets for each network flow of interest. The sampled packets may include annotations and may be sent to collector circuitry for analysis. Controller circuitry may enforce consistent sampling policies across the network switches.

20 Claims, 12 Drawing Sheets

(56) References Cited

U.S. PATENT DOCUMENTS

| | | | |
|---|---|---|---|
| 2005/0182841 A1* | 8/2005 | Sharp | H04L 69/161 709/228 |
| 2014/0281169 A1* | 9/2014 | Mehrotra | G06F 12/0866 711/103 |
| 2019/0158635 A1* | 5/2019 | Donnelly | H03M 7/30 |
| 2021/0218647 A1 | 7/2021 | Rangarajan et al. | |
| 2021/0218651 A1 | 7/2021 | Rangarajan et al. | |

OTHER PUBLICATIONS

Yibo Zhu et al., Packet-Level Telemetry in Large Datacenter Networks, SIGCOMM, Aug. 17-21, 2015, p. 479-491, London, United Kingdom.

N.G. Duffield et al., Trajectory Sampling for Direct Traffic Observation, IEEE/ACM Transactions on Networking, Jun. 2001, vol. 9, No. 3, pp. 280-292, New Jersey, United States.

P. Phaal et al., InMon Corporation's sFlow: A Method for Monitoring Traffic in Switched and Routed Networks, InMon Corp., Sep. 2001, p. 1-31.

\* cited by examiner

| TABLE ENTRY | LOW ENTROPY | | | HIGH ENTROPY | |
|---|---|---|---|---|---|
| MATCH ON PACKET DATA FIELD | SRC L4 PORT | DST L4 PORT | ... | 2 LSBs OF L4 CHECKSUM NUMBER (16 BITS TOTAL) | ... |
| NUMBER OF BITS | 16 | 16 | | 2 | |
| VALUE OF BITS | A | B | * | $11_2$ | * |

FIG. 7A

| PACKET Q | LOW ENTROPY | | | HIGH ENTROPY | |
|---|---|---|---|---|---|
| DATA FIELD | SRC L4 PORT | DST L4 PORT | ... | 2 LSBs OF L4 CHECKSUM NUMBER (16 BITS TOTAL) | ... |
| NUMBER OF BITS | 16 | 16 | | 2 | |
| VALUE OF BITS | D | E | * | $11_2$ | * |

FIG. 7B

| PACKET R | LOW ENTROPY | | | HIGH ENTROPY | |
|---|---|---|---|---|---|
| DATA FIELD | SRC L4 PORT | DST L4 PORT | ... | 2 LSBs OF L4 CHECKSUM NUMBER (16 BITS TOTAL) | ... |
| NUMBER OF BITS | 16 | 16 | | 2 | |
| VALUE OF BITS | A | B | * | $10_2$ | * |

FIG. 7C

| PACKET P | LOW ENTROPY | | | HIGH ENTROPY | |
|---|---|---|---|---|---|
| DATA FIELD | SRC L4 PORT | DST L4 PORT | ... | 2 LSBs OF L4 CHECKSUM NUMBER (16 BITS TOTAL) | ... |
| NUMBER OF BITS | 16 | 16 | | 2 | |
| VALUE OF BITS | A | B | * | $11_2$ | * |

SAMPLING POLICY

| LOW ENTROPY DATA FIELDS | | | HIGH ENTROPY DATA FIELDS | |
|---|---|---|---|---|
| SRC L4 PORT | DST L4 PORT | ... | TCP SEQUENCE NUMBER | ... |
| MATCH ON SOURCE PORT NUMBER S ← 202 | MATCH ON DESTINATION PORT NUMBER D ← 204 | * | MATCH ON A PORTION OF THE BITS B REPRESENTING THE TCP SEQUENCE NUMBER | * |

SAMPLING POLICY

| LOW ENTROPY DATA FIELDS | | HIGH ENTROPY DATA FIELDS | |
|---|---|---|---|
| IP SRC | ... | IP PACKET ID NUMBER | ... |
| MATCH ON SOURCE IP ADDRESS/PREFIX S ← 212 | * ← 214 | MATCH ON A PORTION OF THE BITS B REPRESENTING THE IP PACKET ID NUMBER | * |

NETWORK TELEMETRY

This application claims the benefit of Indian Provisional Patent Application No. 202141009825, filed Mar. 9, 2021, which is hereby incorporated by reference herein in its entirety.

BACKGROUND

This relates to communication networks, and more particularly, to communications networks having network nodes for forwarding network traffic.

Communications networks such as packet-based networks include network nodes such as network switches and/or other network devices. The network nodes are used in forwarding network traffic or network flows, such as in the form of packets, between end hosts (e.g., from packet sources to packet destinations). Controller circuitry can be used to control the network nodes in forwarding the network traffic.

In order to allow a user to efficiently operate and identify any issues or inefficiencies in such a network, it is crucial to gather meaningful information regarding the timings associated with and/or the paths taken by corresponding packets for one or more network flows in traversing the network nodes. This information can help the user understand the operating parameters of the network such as network topology, routing algorithms, etc., and troubleshoot network issues such as routing inefficiencies, packet congestion, packet delays, packet losses, etc.

However, it may be difficult to generate the proper information to efficiently identify and characterize network issues (e.g., identify if congestion is occurring, determine at which network node(s) the issues such as congestion, delays, and/or losses are occurring). Take as an illustrative example, the network implemented using a leaf-spine network or a fat-tree network where there are multiple paths between pairs of end hosts (e.g., between packet sources and packet destinations). In this example, while packets traversing a first path between a pair of end hosts may exhibit packet losses, network probes (e.g., probe packets) meant to diagnose such packet losses can traverse any number of the other paths between the pair of end hosts and overlook the packet loss issues along the first path. If such issues (e.g., along the first path) are intermittent as opposed to persistent, it becomes even more challenging to identify and characterize the issues.

These difficulties are not limited to the specific types of networks described in this example. More generally, if network probes do not reproduce the precise nature of the issues (e.g., reproduce the specific characteristics of the problematic packets such as packet length, bytes at a particular position in the packet, specific protocol types, etc., reproduce the ingress/egress ports traversed by the packets, reproduce the timing of the packet traversal, etc.), the issues can go undetected by the probe packets.

While using user network traffic (e.g., non-probe or user packets sent from packet sources to packet destinations) to identify and characterize network issues is possible, this approach suffers from problems of inconsistent sampling of packet information, thereby leading to the gathering of unhelpful information, and in some cases, even interferes with the normal forwarding of the user network traffic.

It is within this context that the embodiments described herein arise.

BRIEF DESCRIPTION OF THE DRAWINGS

FIGS. 7A-7D are tables of an illustrative matching table entry and illustrative packet data compared to the forwarding table entry in accordance with some embodiments.

FIGS. 10 and 11 are tables of two illustrative policies using matching schemes based on low and high entropy data fields in accordance with some embodiments.

DETAILED DESCRIPTION

Figure 1:
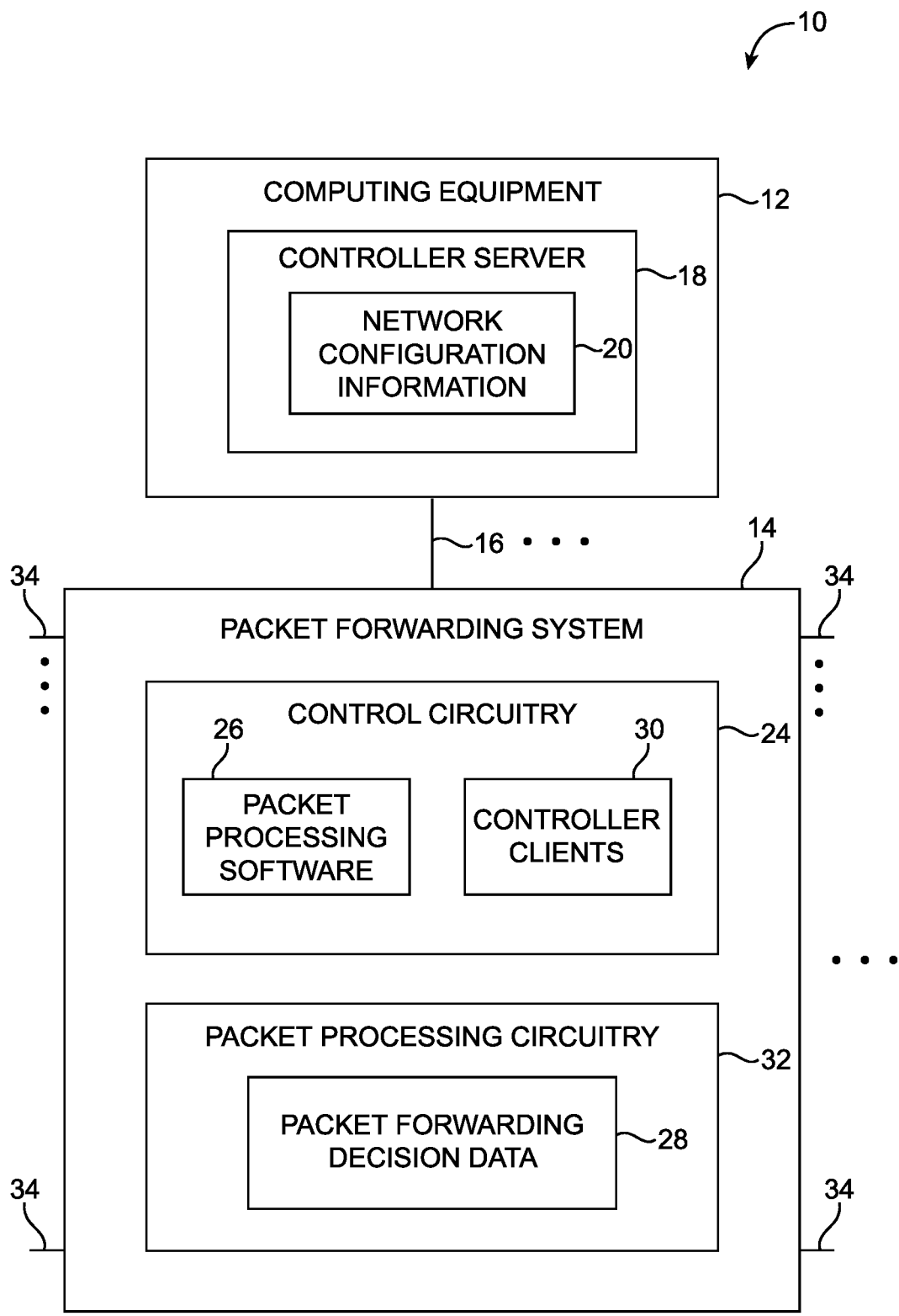
FIG. 1 is a diagram of an illustrative network that includes controller circuitry and a packet forwarding system in accordance with some embodiments.

Controller circuitry is configured to control a plurality of network nodes such as network switches. These network nodes may be configured to forward packets between various end hosts coupled to the network nodes. To more efficiently diagnose network issues such as packet loss, packet delay, inefficient forwarding policy, and/or otherwise monitor the operation of the network, the controller circuitry may provide a consistent sampling policy across multiple network nodes to consistently sample the same packets associated with one or more network flows.

In particular, for a given network flow of interest, the policy provided from the controller circuitry may configure the network nodes to match on one or more low entropy data fields that define the network flow of interest and also on at least a portion of a high entropy data field that consistently identifies at least a corresponding portion of the packets in the network flow of interest (e.g., a pseudo-random set of packets in the network flow of interest). As an example, low entropy data fields for a given network flow may be data fields having values that remain consistent across all of the packets in the network flow, and high entropy data fields for a given network flow may be data fields having values that are variable across the packets even in the same network flow.

The packets matching on both the one or more low entropy data fields and the portion of the high entropy data field (e.g., one or more bits of the high entropy data field or a subset of values taken on by the high entropy data field, one or more bits of multiple or combinations of high entropy fields, subsets of values from multiple or combinations of high entropy fields) may be representative of a randomized set of packets within the network flow of interest. The same matched packets in the network flow of interest may be sampled at each of the network nodes and provided to collector circuitry. Consistently providing the same set of packets (e.g., using the combination of low and high entropy data field matching) across two or more network nodes to the collector circuitry may allow detailed analysis on the specific path taken by each of the sampled packets as well as provide temporal data on the traversal of the matched packets across the network. If desired, this type of sampling (e.g., using low and high entropy data field matching) may occur simultaneously for multiple network flows of interest.

In some embodiments, the controller circuitry may control one or more network nodes at an ingress edge of a network domain to selectively mark some packets (e.g., modify a same unused data field in the packets) in one or more network flows. The controller circuitry may also provide a sampling policy to all of the network nodes to match on the modified data field (e.g., the bit in the modified data field used for marking) and to sample the matched packets.

By using the low and high entropy data field matching (or the matching of the marked packets) and providing a consistent sampling policy across multiple network nodes, the controller circuitry and the network may enable the efficient and consistent sampling of useful network information, which provides both spatial and temporal details for the same set of network packets. The network nodes, the controller circuitry, the collector circuitry, and other elements in accordance with the present embodiments are described in further detail herein.

Controller Circuitry and Network Nodes

Networks such as the internet, local and regional networks (e.g., an enterprise private network, a campus area network, a local area network, a wide area network, or networks of any other scopes), and cloud networks (e.g., a private cloud network, a public cloud network, or other types of cloud networks) can rely on packet-based devices for intra-network and/or inter-network communications. These network packet-based devices may sometimes be referred to herein as network nodes. While network nodes may be implemented as any suitable network device (e.g., a network device having network traffic switching or routing, or generally, forwarding capabilities, a device having a matching engine, a firewall device, a router, etc.), configurations in which one or more network nodes are implemented as network switches are described herein as illustrative examples.

In particular, these network switches, which are sometimes referred to herein as packet forwarding systems, can forward packets based on address information. In this way, data packets that are transmitted by a packet source can be delivered to a packet destination. Packet sources and destinations are sometimes referred to generally as end hosts. Examples of end hosts include personal computers, servers (e.g., implementing virtual machines or other virtual resources), and other computing equipment such as portable electronic devices that access the network using wired or wireless technologies.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network. A common control module (sometimes referred to herein as a controller client) may be incorporated into each of the network switches (e.g., from a single vendor or from multiple vendors). A centralized controller such as a controller server or distributed controller server (sometimes referred to herein as controller circuitry or management circuitry) may interact with each of the controller clients over respective network links. In some configurations, the use of a centralized cross-platform controller and corresponding controller clients allows potentially disparate network switch equipment (e.g., from different vendors) to still be centrally managed. If desired, the centralized controller may be configured to control only a subset of network switches (from a single compatible vendor) in the network.

With one illustrative configuration, which is sometimes described herein as an example, centralized control is provided by one or more controller servers such as controller server 18 of FIG. 1. Controller server 18 may be implemented on a stand-alone computer, on a cluster of computers, on a set of computers that are distributed among multiple locations, on hardware that is embedded within a network switch, or on other suitable computing equipment 12. Computing equipment 12 may include processing and memory circuitry (e.g., one or more processing units, microprocessors, memory chips, non-transitory computer-readable storage media, and other control circuitry) for storing and processing control software (e.g., implementing the functions of controller server 18). Controller server 18 can run as a single process on a single computer or can be distributed over several hosts for redundancy. The use of a distributed arrangement can help provide network 10 with resiliency against unexpected network partitions (e.g., a situation in which one or more network links between two network portions is disrupted). In distributed controller arrangements, controller nodes can exchange information using an intra-controller protocol. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. As an example, controller 18 may receive copies of Link Layer Discovery Protocol (LLDP) packets from network devices coupled to and/or forming a portion of network 10 to gather information about and identify the topology of network 10. If desired, a link-state routing protocol such as Intermediate System to Intermediate System (IS-IS) protocol or Open Shortest Path First (OSPF) protocol may be used (e.g., at the network nodes of network 10) to gather link state information about neighboring devices. If desired, network servers such as controller server 18 may receive the link state information using through Border Gateway Protocol (BGP) routing protocol (e.g., using BGP-LS). As another example, controller server 18 may send LLDP probe packets or other packets through the network to identify the topology of network 10.

Controller server 18 may use information on network topology and information on the capabilities of network devices to determine appropriate paths for packets flowing through the network. Once appropriate paths have been identified, controller server 18 may send corresponding settings data (e.g., configuration data) to the hardware in network 10 (e.g., switch hardware) to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to enforce and implement network configuration information 20, such as network configuration rules, network policy information, and user input information, stored on the memory circuitry of computing equipment 12. As examples, configuration information 20 may specify which services are available to various network entities, various capabilities of network devices, etc.

Controller server 18 and controller clients 30 at respective network switches 14 can use network protocol stacks to communicate over network links 16. Each switch (e.g., each packet forwarding system) 14 has input-output ports 34 (sometimes referred to as ports or network switch interfaces). Cables may be used to connect pieces of equipment to ports 34. For example, end hosts such as personal computers, web servers, and other computing equipment can be plugged into ports 34. Ports 34 can also be used to connect one of switches 14 to other switches 14. Packet processing circuitry 32 may be used in forwarding packets from one of ports 34 to another of ports 34 and may be used in performing other suitable actions on incoming packets. Packet processing circuitry 32 may be implemented using one or more integrated circuits such as dedicated high-speed switch circuits (e.g., ASICs) and may serve as a hardware data path.

Control circuitry 24 at switch 14 may include processing and memory circuitry (e.g., one or more processing units, microprocessors, memory chips, non-transitory computer-readable storage media, and other control circuitry) for storing and running control software, and may sometimes be referred to as control unit 24. Control circuitry 24 may store and run software such as packet processing software 26, may be used to support the operation of controller clients 30, may be used to support the operation of packet processing circuitry 32, and may store packet forwarding information. If desired, packet processing software 26 that is running on control circuitry 24 may be used in implementing a software data path.

Using a suitable protocol, controller server 18 may provide controller clients 30 with data that determines how switch 14 is to process incoming packets from input-output ports 34. With one suitable arrangement, packet forwarding information from controller server 18 may be stored as packet forwarding decision data 28 (sometimes referred to herein as packet processing decision data 28) at packet processing circuitry 32. In particular, packet processing circuitry 32 may separately include processing and memory circuitry, and the memory circuitry may include arrays of memory elements storing packet forwarding processing decision data 28 (e.g., entries in a general matching table usable as a forwarding table for forwarding packets through the network, a routing table for routing functions, a switching table for switching functions, a sampling table for sampling functions etc., and implementable as a content addressable memory (CAM) table implemented on CAM circuitry, a ternary CAM (TCAM) table implemented on TCAM circuitry, etc.). In other words, the memory circuitry storing the entries of data 28 may be used in implementing a matching engine (sometimes referred to as a packet forwarding engine) in packet processing circuitry 32.

If desired, control circuitry 24 may store a corresponding version of packet processing decision data 28 as cache storage. This is, however, merely illustrative. The memory elements storing packet processing decision data 28 may serve as the exclusive storage for packet processing decision data entries in switch 14 or may be omitted in favor of packet processing decision data storage resources within control circuitry 24. Packet processing decision data entries may be stored using any suitable data structures or constructs (e.g., one or more tables, lists, etc.). In order to not unnecessarily obscure the present embodiments, packet processing decision data 28 (e.g., whether maintained in a database in control circuitry 24, stored within an array of memory elements of packet processing circuitry 32, or generally stored in any type of memory, and whether used for forwarding, routing, switching, or sampling packets) is sometimes described herein as being implemented using one or more matching tables having corresponding entries.

In general, a packet processing decision engine configured by configuration data such as packet processing decision data 28 may perform any suitable type of processing (e.g., associated with any corresponding networking protocol, and using the corresponding header fields associated with the networking protocol) to assist packet forwarding system 14 in making forwarding decisions of network packets. Configurations in which a network includes switches storing matching tables usable in making switching, routing, and generally forwarding decisions are described herein as illustrative examples. The principles of the embodiments described herein may similarly be implemented in networks that include switches or network nodes of other types storing packet processing decision data in other manners.

Various switch and controller configurations may also be used in processing packets. If desired, any switch or network node may be provided with controller clients that communicate with and are controlled by a controller server. As an example, switch 14 may be implemented using a general-purpose processing platform that runs control software and that omits packet processing circuitry 32. As another example, switch 14 may be implemented using control circuitry that is coupled to one or more high-speed switching integrated circuits ("switch ICs"). As yet another example, switch 14 may be implemented as a line card in a rack-based system having multiple line cards each with its own packet processing circuitry. If desired, switches 14 may be organized in a leaf-spine configuration in a rack-based system. The controller server may, if desired, be implemented on one or more line cards in the rack-based system, in another rack-based system, or on other computing equipment (e.g., equipment separate from the rack-based system) that is coupled to the network.

Figure 2:
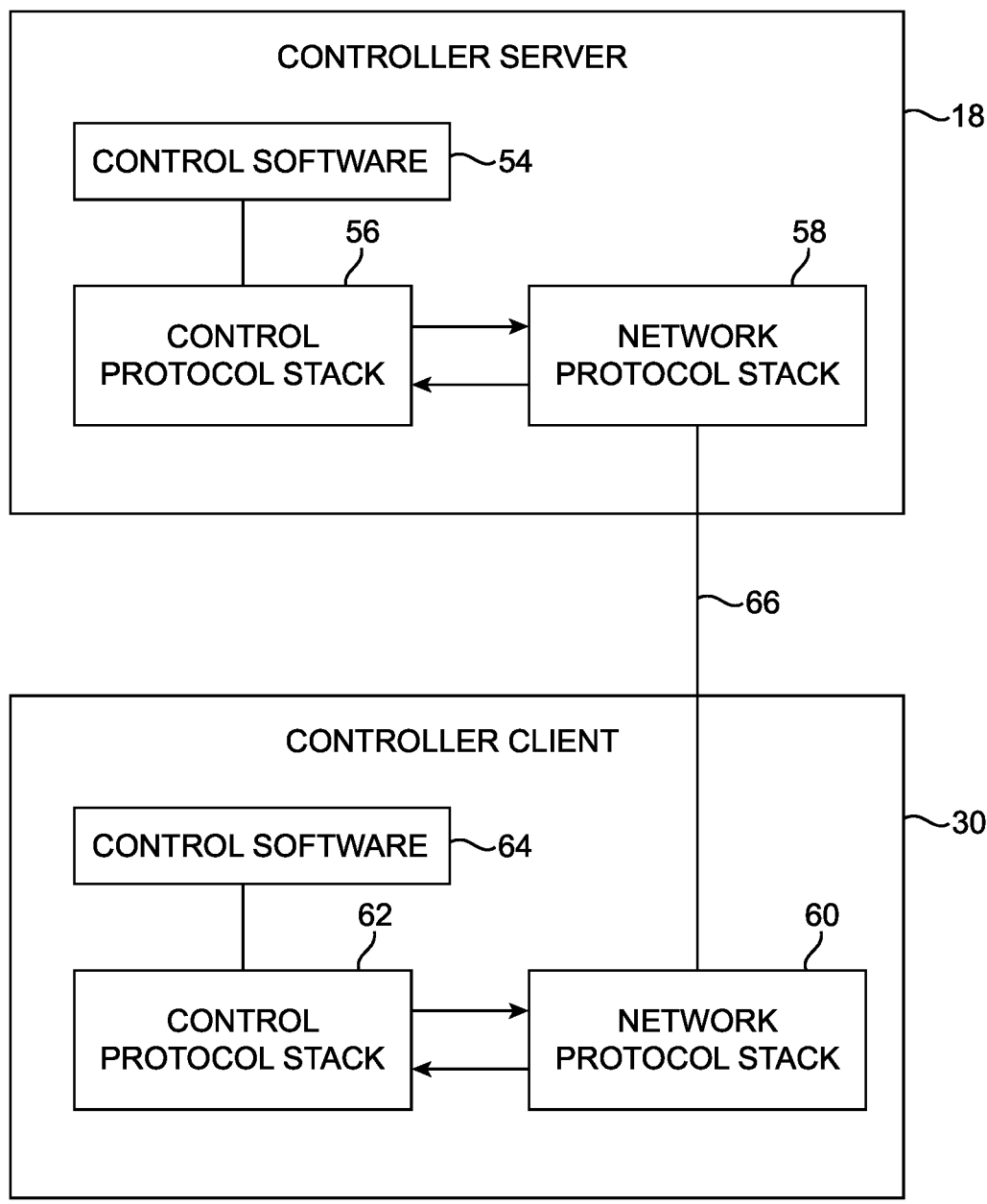
FIG. 2 is a diagram of a controller server and a controller client that may communicate over a network connection in accordance with some embodiments.

As shown in FIG. 2, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a backbone path in a rack-based system. Arrangements in which path 66 is a network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stack 56 generates and parses control protocol messages (e.g., control messages to activate a port or to install a particular matching table entry into a matching table). By using arrangements of the type shown in FIG. 2, a network connection is formed over the link between controller server 18 and controller client 30. If desired, controller server 18 and controller client 30 can communicate using a Transmission Control Protocol (TCP) or User Datagram Protocol (UDP) over Internet Protocol (IP) network connection. If desired, controller server 18 and controller clients 30 may communicate with each other over the network connection using control protocols such as Simple Network Management Protocol (SNMP) and Open-Flow protocol (as examples).

Packet Processing

Packet processing decision data 28 (FIG. 1) such as a matching table 28 may include multiple entries each configured to match on one or more fields such as packet header fields. Packet processing circuitry 32 (e.g., implemented using a matching engine based on matching table 28) may compare fields in an incoming packet received by switch 14 to the corresponding fields in entries of matching table 28. Each entry of matching table 28 may have associated actions. When there is a match between (one or more) fields in a packet and corresponding fields in a matching table entry (sometimes referred to herein as a matching criterion), packet processing circuitry 32 may take the corresponding action for that entry. As example, packet processing circuitry 32 may use the matching table entries to perform networking functions such as ethernet switching, internet routing, general packet forwarding, firewalling, or any other suitable networking functions.

As an example, each matching table entry may be implemented as a portion (e.g., a row) in a TCAM table (e.g., formed from TCAM circuitry having memory elements storing data corresponding to matching criteria of the matching table entry such as data to match on one or more header fields of an incoming packet). These header fields may include, as examples, ingress port (i.e., the identity of the physical port in switch 14 through which the packet is being received), Ethernet source address, Ethernet destination address, Ethernet type, virtual local area network (VLAN) identification (sometimes referred to as a VLAN tag), VLAN priority, IP source address, IP destination address, IP protocol type, IP packet ID number, IP ToS (type of service) bits, source layer 4 (L4, transport layer) port number (e.g., TCP source port, UDP source port, etc.), destination layer 4 port number (e.g., TCP destination port, UDP destination port, etc.), layer 4 checksum, and TCP sequence number. Other fields may be used if desired.

If desired, the entries may include fields having don't care values or bits. When a don't care value or bit is present in a particular field of that entry, all incoming packets will be considered to form a "match" with respect to the field, regardless of the particular value of the field in the incoming packet. Additional fields in that entry may still match other packet information (e.g., other packet header values of network packet).

Each entry (e.g., in the matching table) may be associated with zero or more actions that dictate how the switch handles matching packets. In some instances, if no actions are present, the packet may be preferably dropped. If desired, switch 14 may maintain statistical data (counter values) that can be queried by controller server 18 when it is desired to obtain information on the performance of switch 14.

The examples of these matching table entries are merely illustrative. If desired, packet processing decision data may be translated to one or more entries in multiple corresponding matching tables (e.g., used by one or more application-specific integrated circuits (ASICs) on switch 14) for corresponding functions. In general, packet processing decision data may be conveyed and stored between controller server 18 and switch 14 in any suitable format (e.g., the entries described herein are a representation of various packet matching schemes usable by different packet processing circuitry architectures). In other words, depending on the specific configuration of switch 14 (e.g., the type of networking switch control unit or architecture, the type of packet processing circuitry architecture, the type of forwarding ASIC architecture, the ASIC implementation of switch 14, etc.), any suitable representation of each entry may be stored at and used by switch 14 (and/or at controller server 18).

Matching table entries 28 may be loaded into a switch 14 by controller server 18 during system setup operations or may be provided to a switch 14 from controller server 18 in real time in response to receipt and processing of packets at controller server 18 from switches such as switch 14. In a network with numerous switches 14, each switch can be provided with appropriate matching table entries (e.g., implementing packet forwarding entries that form one or more forwarding paths through the network).

Figure 3:
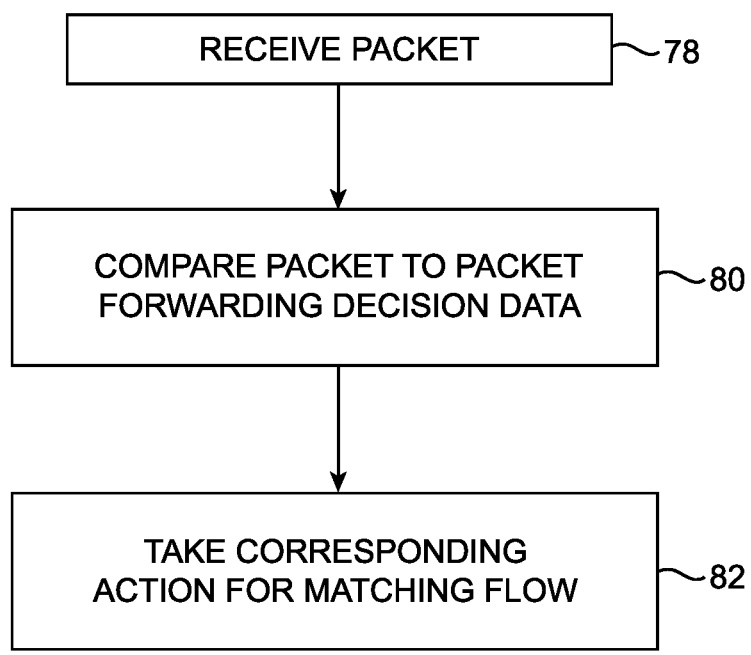
FIG. 3 is a flowchart of illustrative steps involved in processing packets in a packet processing system in accordance with some embodiments.

Illustrative steps that may be performed by switch 14 in forwarding packets that are received on input-output ports 34 are shown in FIG. 3. At step 78, switch 14 receives a packet on one of its ports (e.g., one of input-output ports 34 of FIG. 1). At step 80, switch 14 (e.g., packet processing circuitry 32) compares the fields of the received packet to the fields of the matching (e.g., forwarding) table entries in a forwarding table of that switch to determine whether there is a match and to take one or more corresponding forwarding actions defined by the forwarding table entries. If it is determined during the operations of step 80 that there is a match between the packet and a forwarding table entry, switch 14 (e.g., packet processing circuitry 32) performs the action that is associated with that forwarding table entry (step 82). Switch 14 may subsequently forward other received packets in a similar manner. If it is determined during the operations of step 80 that there is no match between the fields of the packet and the corresponding fields of the forwarding table entries, the packet may be dropped and/or any other suitable actions may be taken. The processing schemes described above are merely illustrative. The illustrative sampling schemes described herein may similarly be applied to any suitable type of processing scheme.

Network Node for Packet Sampling

To ensure the proper operation of network 10 (e.g., identify network issues and inefficiencies within network 10), it may be necessary to gather network information using the network nodes in network 10. However, as described above, gathering network information using test packets may have various issues (e.g., irreproducible conditions of the issues), and care must be taken when gathering network information using user packets as inconsistent sampling can similarly fail to identify specific issues. FIGS. 4-7 show features associated with an illustrative scheme by which packets for different network flows may be consistently sampled as desired.

Figure 4:
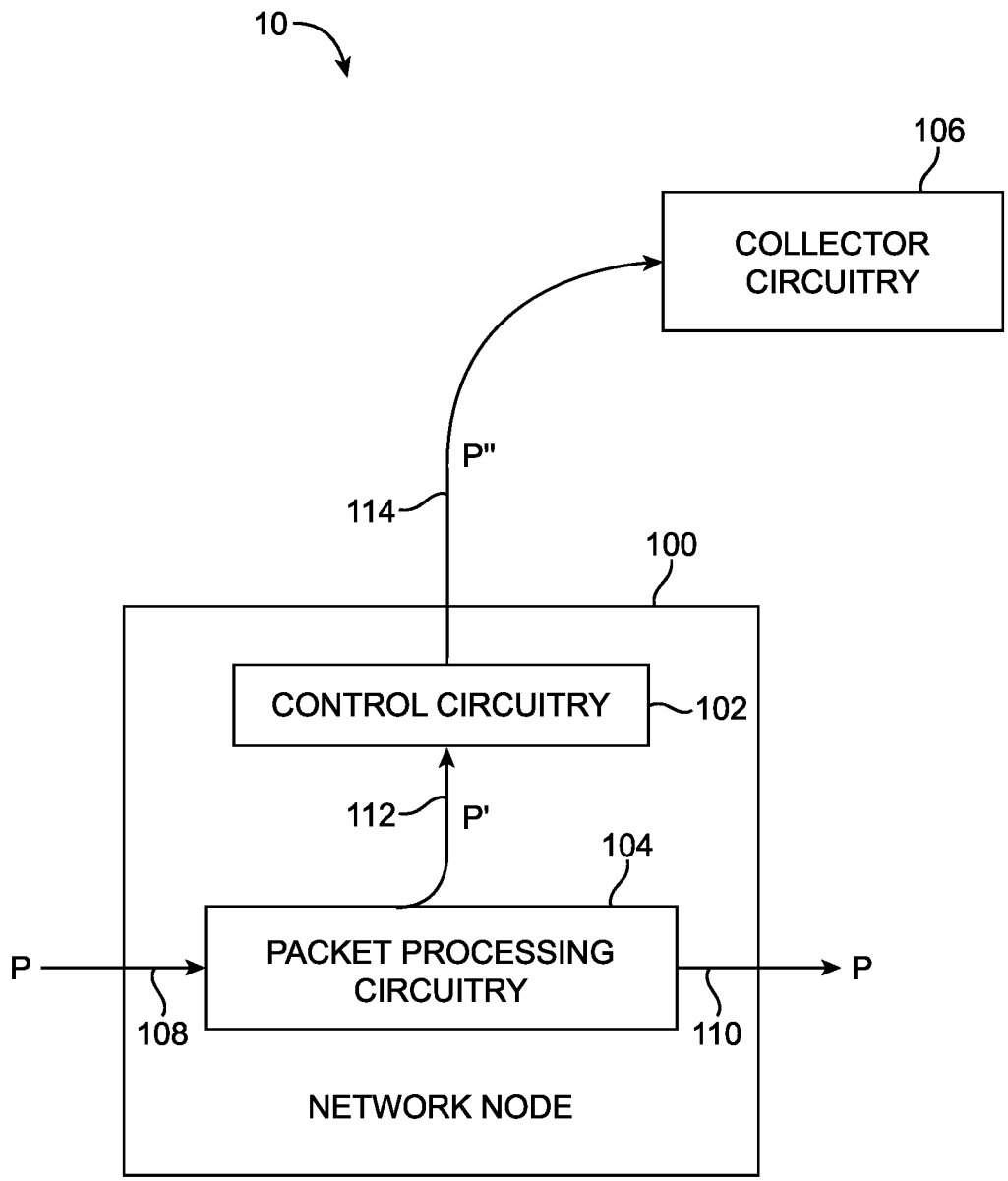
FIG. 4 is a diagram of an illustrative network node configured to selectively provide a sampled packet to collector circuitry in accordance with some embodiments.

In the example of FIG. 4, network 10 includes an illustrative network node 100 (e.g., a packet forwarding system or network switch 14 in FIG. 1). Network node 100 includes control circuitry 102 (e.g., control circuitry 24 in FIG. 1) and packet processing circuitry 104 (packet processing circuitry 32 in FIG. 1).

To selectively sample packets associated within one or more network flows, packet processing circuitry 104 may include a matching engine configured to selectively identify the packets to be sampled using a matching table (sometimes referred to herein as a sampling table or sampling entries in the matching table, when the corresponding entries are used to sample packets for telemetry or for other functions). As an illustrative example, packet processing circuitry 104 may include a TCAM-based matching engine having TCAM circuitry for storing the matching table (e.g., a TCAM table where an array of memory elements in the TCAM circuitry store entries in the matching table).

If desired, the matching table may include entries for packet sampling and/or entries for packet forwarding (e.g., packet switching, packet routing, etc.). If desired, packet processing circuitry 104 may store entries for packet sampling separately from entries for packet forwarding (e.g., at corresponding TCAM circuitry, at corresponding matching engines, etc.).

In particular, the matching table may include entries that have corresponding values associated with respective data fields. These table entry values may be compared to values at the same respective packet data fields (e.g., data fields that the table entries match on). In such a manner, the two corresponding values (e.g., values stored at the table entries and the values in the packet fields) may be compared to determine whether a match exists between that entry and the packet, in which case the packet processing circuitry 104 may take the corresponding action (e.g., sample the incoming packet).

Figure 5:
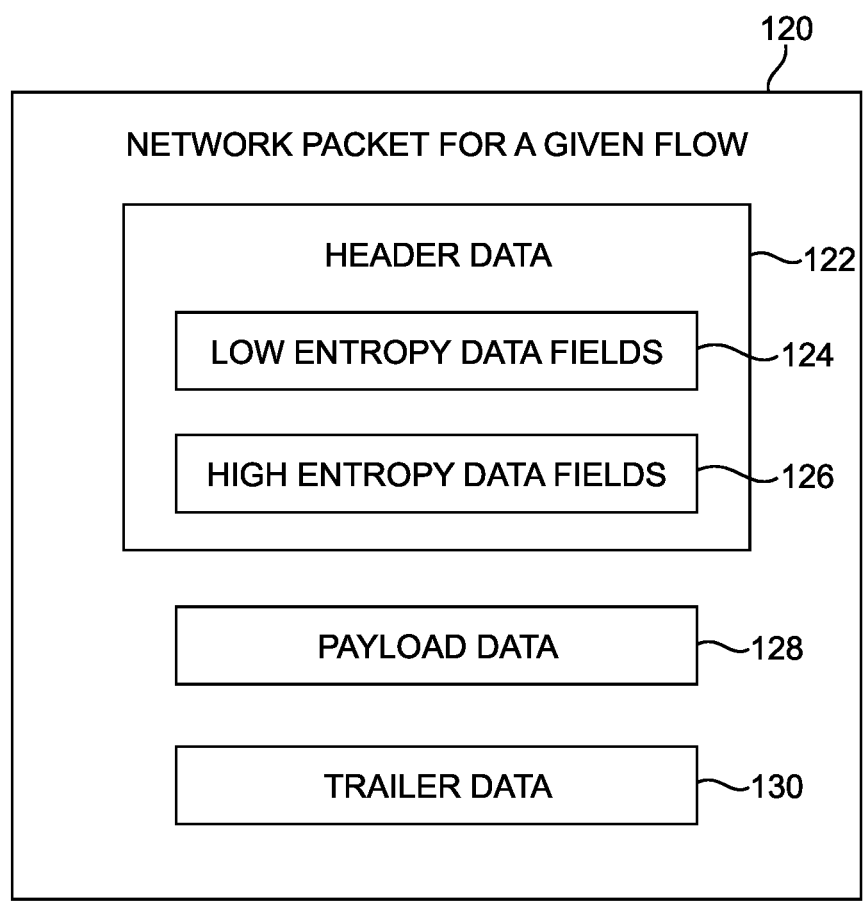
FIG. 5 is a diagram of an illustrative packet in a corresponding network flow having low entropy data fields and high entropy data fields in accordance with some embodiments.

To facilitate a consistent matching process, the matching engine may match on both low and high entropy data fields for each received network packet. FIG. 5 shows an illustrative packet 120 containing data organized in different portions and in low and high entropy data fields. In particular, packet 120 includes header data or values 122 (e.g., stored at corresponding header data fields in packet 120), payload data or values 128 (e.g., stored at the payload data fields in packet 120), and trailer data or values 130 (e.g., stored at corresponding trailer data fields in packet 120).

In general, a packet such as packet 120 may include a multitude of data fields each containing different information associated with the packet. While each data field may hold corresponding values indicative of different information, some of these data fields may be categorized. In particular, packet 120 and other packets may belong to a particular network flow of interest (e.g., a subset of network traffic to be sampled and analyzed, a subset of network traffic associated with one or more network issues, etc.). Packets within the particular network flow may share certain similarities. As examples, packets in the same network flow may each have the same source IP address, may each have the same destination IP address, may each have the same source IP address and the same destination IP address, may each have the same protocol type, etc. These similarities may themselves define the network flow.

Take as an example a case in which a user notices unusual behavior or issues from a first IP domain to a second IP domain. The user may identify the network flow of interest as any packet between traveling from the first IP domain (e.g., packets having one or more source IP addresses associated with the first IP domain and one or more destination IP address associated with the second IP domain). Based on this, it may be desirable to sample one or more of these packets.

Low and High Entropy Data Fields

To properly sample one or more of the packets in the network flow of interest, the matching engine in packet processing circuitry 104 may be configured with (e.g., may store) a matching table entry having values that match with corresponding values associated with one or more types of packet data fields (e.g., packet header data fields). As shown in the example of FIG. 5, header fields in packet 120 may include: one or more low entropy data fields 124, and one or more high entropy data fields 126. In other words, a first portion of header data 122 may be categorized as data in one or more low entropy data fields 124, and a second portion of header data 122 may be categorized as data in one or more high entropy data fields 126.

The entropy described herein relate to variance of the values stored at the data field across packets in the same network flow. In particular, the low entropy data fields are the data fields storing values that have low variance (e.g., have zero variance or the same fixed value, take on values that represent less than one percent of all possible values of the data field, etc.) across packets of the same network flow, and in essence, are identified with and define the network flow. As an example, even different packets within the same network flow may have the same (or similar) values stored at a given low entropy data field. In such a manner, corresponding values stored at respective low entropy data fields may be used (e.g., matched on) to identify packets in a particular network flow from packets of different network flows.

In contrast to the low entropy data fields, high entropy data fields are data fields storing values that have high variance (e.g., taken on values that represent one hundred percent of all possible values of the data field, greater than ninety percent of all possible values of the data field, greater than fifty percent of all possible values of the data field, etc.) across packets of the same network flow, and in essence, may distinguish different packets from one another in the same network flow.

As an example, packets within the same network flow may have varied values stored at a given high entropy data field. Although each value at the high entropy data field for a given packet may be deterministically generated or calculated based on a packet counter, a byte counter, a checksum based on other packet values, etc., the use of these methods to calculate each of these values can provide sufficiently varied values across the different packets in the same network flow. As such, for the sake of identifying and/or selecting packets in the same network flow, using these values at the given high entropy data field may help identify a sufficiently random representation of the network flow (e.g., a subset of seemingly random packets without unwanted systematic bias).

In such a manner, corresponding values or a portion of the values (e.g., a subset of bits) stored at one or more high entropy data fields may be used (e.g., matched on) to identify different packets (e.g., a pseudo-random subset of packets) within each network flow. Consequently, when used in combination with values at corresponding low entropy data fields, values or a portion of the values at the one or more high entropy data fields may be used to identify and sample a varied number of packets within a same network flow (e.g., by matching on these low and high entropy data fields).

Additionally, these high entropy data field values may also have the desirous property of being unaltered during packet traversal through the network (e.g., not being modified as the packets are forwarded from hop-to-hop). The same identified subset of packets may therefore be consistently identified and sampled across the network using these unaltered high entropy data field values.

Figure 6A:
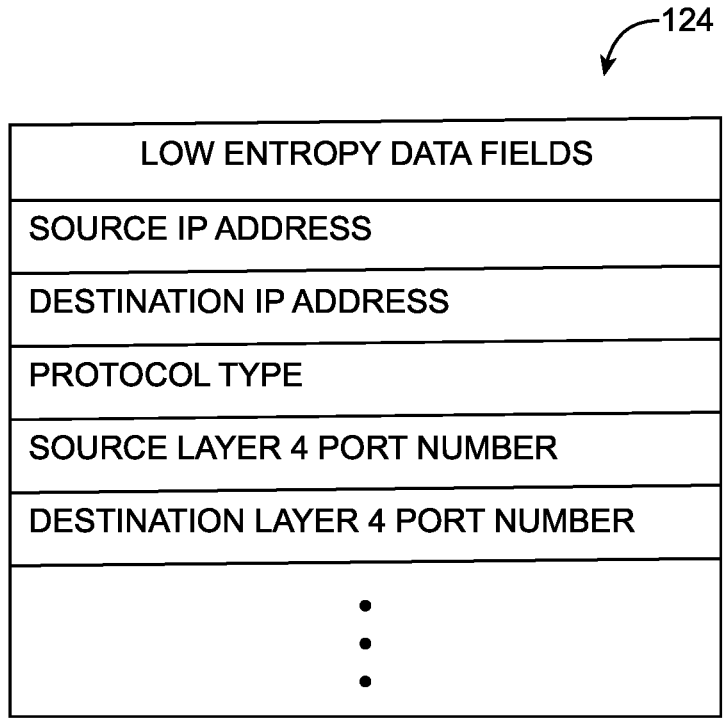
FIGS. 6A and 6B are tables of illustrative header data fields identifiable as low and high entropy data fields in accordance with some embodiments.
Figure 6B:
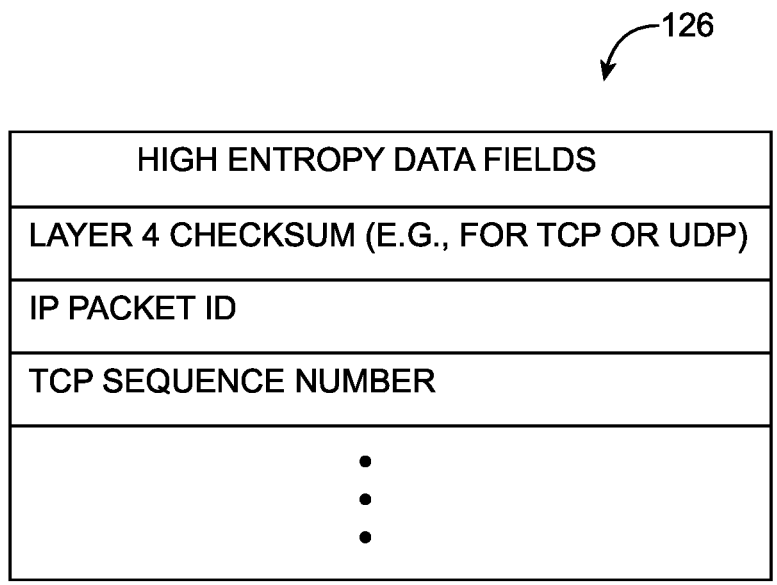

FIGS. 6A and 6B show respective tables of illustrative low entropy data fields 124 and high entropy data fields 126 within a packet. As shown in FIG. 6A, low entropy data header data fields may include a source IP address data field, a destination IP address data field, a protocol type data field, a source layer 4 port number data field, a destination layer 4 port number data field, or any other suitable data fields. As shown in FIG. 6B, high entropy data header fields may include a layer 4 checksum data field (e.g., for TCP, UDP, SCTP, or any other protocol), an IP packet ID data field, an IP checksum data field, a TCP sequence number data field, an RTP sender timestamp or sequence number field, or any other suitable data fields.

Matching on Low and High Entropy Data Fields

As a particular example described in connection with FIG. 4, the matching engine in packet processing circuitry 104 (e.g., a TCAM-based matching engine) may store a table entry that matches on one or more low entropy header fields and at least a portion of a high entropy data field (e.g., match on portions of multiple high entropy data fields or one or more complete high entropy fields). FIG. 7A shows an illustrative table entry stored in the matching engine (e.g., on TCAM circuitry storing a TCAM table). As shown in FIG. 7A, the table entry includes a 16-bit value of A to be matched on a source layer 4 port number field of a packet, a 16-bit value of B to be matched on a destination layer 4 port number field of a packet, and a 2-bit value of $11_2$ to be matched on a portion (e.g., the 2 least significant bits) of the layer 4 checksum number field (e.g., allocated with a total of 16 bits) of a packet.

Packet processing circuitry 104 (FIG. 4) when configured with (e.g., when storing) the table entry of FIG. 7A may sample any packet (e.g., send an encapsulated or annotated version of the sampled packet to collector circuitry 106) matching on values A and B at the two corresponding low entropy data fields and on value $11_2$ at the two bit locations of the corresponding high entropy data field. In other words, the network flow of interest is associated with the set of packets from layer 4 port number A to layer 4 port number B (e.g., defined by the match on the low entropy fields). The network flow of interest for actual sampling is associated with the subset of packets within the set having value $11_2$ as the 2 LSBs of the layer 4 checksum value (e.g., defined by the match on the portion of the high entropy field).

Among other advantages, the use of matching on the portion of the high entropy field (in conjunction with matching on low entropy fields) may desirably decrease the number of sampled packets within each network flow to avoid flooding of the collector circuitry and/or the network paths with sampled packets. In the example described above and herein where 2 LSBs of the layer 4 checksum value (high entropy field value) are matched on, approximately one fourth of the packets in the network flow may be sampled (e.g., one out of every four packets will match assuming a perfectly even distribution of the 2 LSBs of the layer 4 checksum value across the packets in the network flow). However, in some applications, sampling one fourth of the network flow may still be suboptimal (e.g., may not provide enough computational benefits or computational cost savings). As such, if desired, other schemes may be used.

As other illustrative examples, instead of the 2 LSBs of the layer 4 checksum, matching can occur on three bits of the layer 4 checksum (e.g., resulting in approximately one eighth of the network flow being sampled), on four bits of the layer 4 checksum (e.g., resulting in approximately one sixteenth of the network flow being sampled), on ten bits of the layer 4 checksum (e.g., resulting in approximately 1 in 1024 of packets in the network flow being sampled), etc. In general, any number of bits in the (16-bit) layer 4 checksum value may be matched on, to suitably select and adjust the sampling size. If desired, additional bits from other high entropy data fields may be used in combination with the 16 bits of the layer 4 checksum field to further decrease the sampling size. These examples are merely illustrative and seek to demonstrate the flexibility and tunability, among other advantages, of using the low and high entropy data field matching scheme.

Equipped with the ability to significantly reduce the sampling size of any given network flow if desired, the sampling scheme described herein consequently allow packets from a variety of network flows to be sampled at the same time (e.g., using concurrently enforced sampling policies) without overloading the capacity of the collector circuitry and/or the network paths. Because the matching criteria of the high entropy field can be easily updated, the number of sampled packets within any given network flow may be adjusted adaptively according to the needs of the user (e.g., in real-time, based on predetermined criteria, etc.). Additionally, because high entropy data fields in packets of the same network flow typically store values that are pseudo-randomized or highly variable, matching on these values may provide a representative sampling of packets (e.g., without significant bias) in the corresponding network flow.

FIGS. 7B-7D provide illustrative packet data associated with three different packets that may be processed according to the matching criterion (the table entry) in FIG. 7A. As a first example, packet Q of FIG. 7B may be received at packet processing circuitry 104 configured with the table entry of FIG. 7A. The matching engine at packet processing circuitry 104 may compare value D (e.g., the bits associated with value D) at the source layer 4 port number field in packet Q to value A (e.g., the bits associated with value A) in the table entry, compare value E (e.g., the bits associated with value E) at the source layer 4 port number field in packet Q to value B (e.g., the bits associated with value B) in the table entry, and compare value $11_2$ at the 2 LSBs of the layer 4 checksum number field in packet Q to value $11_2$ in the table entry. The matching engine may determine that packet Q does not match on all three values (e.g., does not match on values A, B, and $11_2$ in the table entry of FIG. 7A) and should not be sampled. In this example, packet Q may not belong to the network flow identified by source layer 4 port number A to destination layer 4 port number B specified by the table entry.

As a second example, packet R of FIG. 7C may be received at packet processing circuitry 104 configured with the table entry of FIG. 7A. The matching engine at packet processing circuitry 104 may compare value A in packet R to value A in the table entry, compare value B to value B in the table entry, and compare value $10_2$ in packet R to value $11_2$ in the table entry. The matching engine may determine that packet R does not match on all three values and should not be sampled. In this example, while packet R belongs to the network flow of interest (e.g., has source layer 4 port number A and destination layer 4 port number B specified by the table entry), packet R is not part of the subset of the network flow of interest to be sampled (e.g., the subset being specified by the match at the portion of high entropy data field).

As a third example, packet P of FIG. 7D may be received at packet processing circuitry 104 configured with table entry of FIG. 7A. The matching engine at packet processing circuitry 104 may compare value A in packet P to value A in the table entry, compare value B to value B in the table entry, and compare value $11_2$ in packet P to value $11_2$ in the table entry. The matching engine may determine that packet P matches on all three values and should be sampled. In this example, packet P may belong to the network flow of interest (e.g., has source layer 4 port number A and destination layer 4 port number B specified by the table entry) and may belong to the subset of the network flow of interest to be sampled (e.g., having a value of $11_2$ matching on the portion of high entropy data field).

While described above, even though packets R and P in FIGS. 7C and 7D both belong to the same network flow, only packet P is sampled based on the table entry in FIG. 7A. If desired, in some instances, controller circuitry may update the table entry in FIG. 7A (stored at the matching engine) to match on only the second-to-last significant bit instead of the two least significant bits. In these instances, the matching engine configured with the updated table entry may sample both packets R and P (and in general may sample an increased number of packets in the same network flow).

Packet Sampling to Collector Circuitry

Referring back to FIG. 4, packet P (e.g., packet P of FIG. 7D) may be received at an ingress interface of network node 100 along path 108. Packet processing circuitry 104, which includes memory circuitry for a matching criterion (e.g., the table entry of FIG. 7A), may match on low and high entropy data fields of packet P and identify packet P for sampling. Additionally, packet processing circuitry 104, which includes memory circuitry for storing one or more additional matching table entries for forwarding may also forward packet P along path 110 to an egress interface of network node 100.

Packet processing circuitry 104 may encapsulate a sampled version of packet P and forward the sampled and encapsulated version of packet P (packet P') along path 112 to control circuitry 102. In particular, packet processing circuitry 104 may annotate packet P' with any suitable telemetry information. As examples, in addition to including one or more fields (e.g., all of the fields of packet P) copied from packet P, packet P' may also include packet forwarding information for packet P such as ingress interface information at node 100 and egress (output) interface information at node 100, temporal information for packet P such as ingress time at node 100 and egress time at node 100, node information such as a node ID number or other identifier for node 100, sampling policy information such as a sampling policy identifier identifying the sampling policy triggering the sampling of packet P at node 100, and/or any other suitable annotation information for telemetry.

Control circuitry 102 may receive packet P' from packet processing circuitry 104 may and forward packet P' (e.g., as packet P") to collector circuitry 106. If desired, control circuitry 102 may parse and modify information stored on packet P' to generate modified packet P''' before sending modified packet P''' to collector circuitry 106. In particular, when packet processing circuitry 104 generates packet P' (e.g., with the above annotations and identifier for telemetry), packet processing circuitry 104 may insert information that is specific to the network node (e.g., that is only locally relevant to the network node). However, locally relevant information may be difficult to parse and understand at collector circuitry 106 and/or other downstream circuitry. Control circuitry 102 may therefore replace the locally relevant information with globally relevant information by translating one or more of the annotation information or identifiers of packet P' to generate packet P'''. Collector circuitry 106 may receive packet P''' with the globally relevant information instead of packet P'.

As an illustrative example, packet P' may include a value of "73" as an ingress interface (port) of node 100. However, this value of "73" may have little meaning (e.g., besides indicating a particular port of node 100) if received at collector circuitry 106. As such, control circuitry 102 may generate packet P''' by translating ingress interface "73" to a corresponding IP address, ethernet address, SNMP "ifIndex" associated with the ingress interface, etc., which provide globally meaningful network information to collector circuitry 106 (e.g., information relevant and directly usable outside of node 100, in the context of the corresponding network domain, or in the network as a whole).

Collector circuitry 106 may be configured to collect sampled packets (e.g., annotated and/or translated packets P''') from one or more network nodes within the network and may organize and/or parse information from the sampled packets. If desired, paths between a network node such as network node 100 and collector circuitry such as collector circuitry 106 may be implemented using portions of the data plane (e.g., paths 108 and 110) and/or may be implemented separately in the control plane. If desired, the sampled packets (e.g., packet P''') may be transmitted to collector circuitry 106 via tunneling (e.g., using a Virtual Extensible LAN (VxLAN) tunnel, using a Generic Routing Encapsulation (GRE) tunnel, using an IP in IP tunnel, etc.).

In some configurations, collector circuitry 106 may be implemented on controller circuitry 18 (FIG. 1). In other configurations, collector circuitry 106 may be implemented separately from controller circuitry 18. If desired, collector circuitry 106 may be configured to forward the sampled packets and/or information regarding the sampled packets to other downstream network devices for further processing and/or for output (e.g., analysis devices, service devices, input-output devices, etc.). If desired, multiple packet collectors may be distributed across the network, and each packet collector may include corresponding processing circuitry and memory circuitry implemented on separate computing equipment.

The low and high entropy field matching scheme and corresponding circuitry implementing the scheme described in connection with FIGS. 4-7 are merely illustrative. If desired, a given network node may include memory circuitry for simultaneously storing multiple matching table entries for forwarding and/or sampling packets in one or more different network flows. In general, any suitable modifications may be made to the scheme described in connection with FIGS. 4-7 to still provide a consistent manner based on which data packets can be sampled.

Sampling for Telemetry Across Multiple Network Nodes

Advantageously, the use of matching on both low and high entropy fields allows different packets (e.g., different subsets of packets) of the same network flow to be consistently identified. This property may be particularly useful when collecting packet data across multiple network nodes as the same subset of network packets may be tracked to efficiently provide consistent temporal and spatial information for telemetry.

Figure 8:
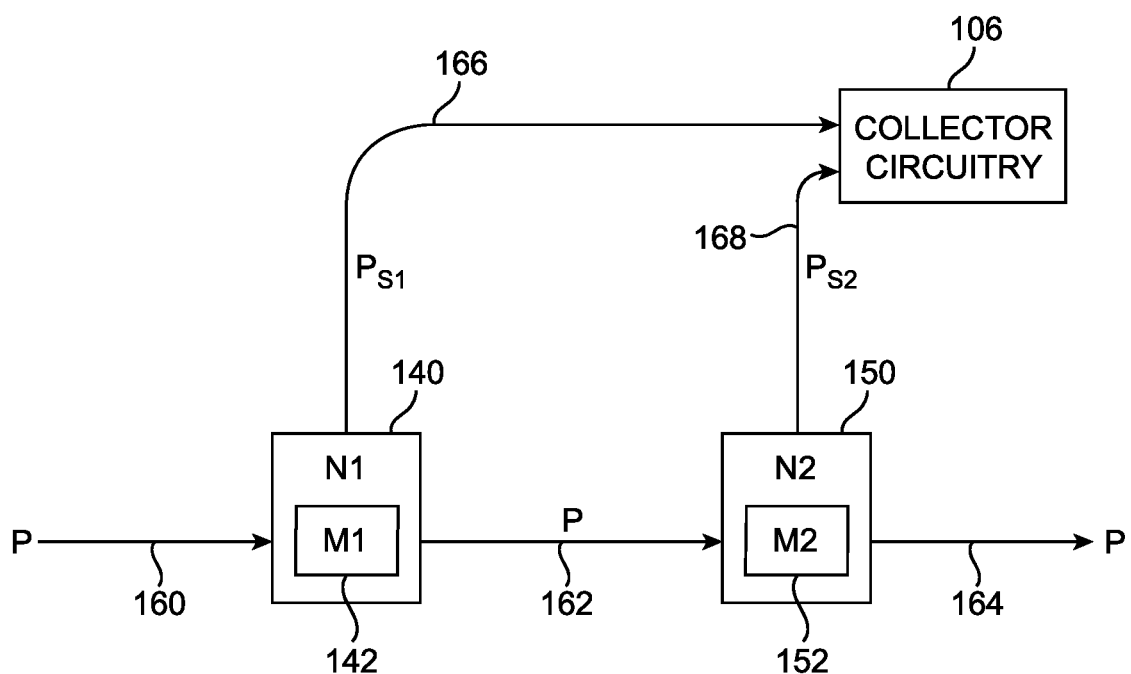
FIG. 8 is a diagram of an illustrative network having two network nodes configured to selective provide sampled versions of the same packet to collector circuitry in accordance with some embodiments.

As shown in the example of FIG. 8, a network includes two network nodes 140 and 150 each having corresponding matching engines 142 and 152 (e.g., matching engine having memory circuitry for storing forwarding and/or sampling table entries such as TCAM circuitry). Packet P traverses both network nodes 140 and 150 (e.g., when traversing the network from a packet source to a packet destination) along forwarding paths 160, 162, and 164. In other words, matching engines 142 and 152 may include forwarding table entries that forward packet P along paths 162 and 164, respectively.

In the illustrative example of FIG. 8, matching engines 142 and 152 may also include sampling table entries (e.g., the same table entry of FIG. 7A) that sample the same packet P at both network nodes 140 and 150. Network node 140 may first provide a sampled (and encapsulated) version of packet P (packet $P_{S1}$ analogous to packet P″ or P′ in FIG. 4) to collector circuitry 106 via path 166. Network node 150 may subsequently provide another sampled (and encapsulated) version of the packet P (packet $P_{S2}$ analogous to another packet P″ or P′ in FIG. 4) to collector circuitry 106 via path 168.

In some configurations, network nodes 140 and 150 (e.g., matching engines 142 and 152) each include clocks that are synchronized to each other (e.g., using precision time protocol (PTP) or IEEE 1588). In these configurations, network packets $P_{S1}$ and $P_{S2}$ respectively sent by network nodes 140 and 150 may include (e.g., may be encapsulated with) timestamps of packet receipt at the corresponding network node and packet transmission from the corresponding network node, or other temporal information generated using the synchronized clocks. By comparing the corresponding temporal information in packet $P_{S1}$ and packet $P_{S2}$, collector circuitry 106 (or controller circuitry 18 in FIG. 1) may determine if any packet delays have occurred (e.g., comparing ingress and egress time at node 140 to determine processing delays at node 140, comparing egress time at node 140 to ingress time at node 150 to determine any delays in forwarding path 162 (e.g., at an non-client network node between client nodes 140 and 150 controlled by controller circuitry).

In some configurations, packets P may be updated to include a timestamp or other identifier such as a counter that is unique to the original packet P (e.g., the identifier may be inserted into the trailer of packet P at the first received node such as node 140). This unique identifier may be carried by packet P along its forwarding path and ultimately ignored by the destination end host. Incorporating this unique identifier into the packet P may help collector circuitry 106 in correlating packet $P_{S1}$ from node 140 with packet $P_{S2}$ from node 150. In some configurations, this unique identifier may be inserted as a "trailer" into the packet (e.g., after the end of the IP packet and before the ethernet CRC) in order that intermediate forwarding nodes and the end node ignore the additional data.

In some configurations, annotated packets such as packets $P_{S1}$ and packet $P_{S2}$ may also include ingress and egress interface (port) information, based on which collector circuitry 106 may identify specific forwarding paths taken by packets. In combination with the temporal information, collector circuitry 106 may identify problematic paths and other issues or inefficiencies by associating the spatial information with the temporal information.

In some configurations, annotated packets such as packets $P_{S1}$ and packet $P_{S2}$ may also include node identifier information identifying the corresponding node at which the packet is sampled. Based on this information, collector circuitry 106 may identify high usable nodes and take corresponding actions as desired (e.g., perform load balancing).

These examples described in connection with FIG. 8 are merely illustrative. If desired, any suitable annotation information may be included in the sampled versions of the packets and sent to corresponding collector circuitry. The controller circuitry, collector circuitry, and/or any other downstream circuitry may process the sampled packet information as desired and may identify or help a user identify issues in the network. If desired, these packets may be associated with one or more network flows and may be collected or sampled at any suitable number of network nodes.

As examples, the controller circuitry, the collector circuitry, the network analysis devices, the service devices, and/or other devices coupled to the collector circuitry may use the collected data in the consistently sampled versions of each packet to gather and identify packet traversal information such as spatial information identifying one or more network devices through which the packet traversed (e.g., at which the packet is sampled) and therefore the corresponding forwarding path, spatial information identifying one or more ingress ports and/or egress ports at the identified network devices through which the packet traversed, temporal information identifying the time periods associated with the packet traversal between any two network devices, temporal information identifying the time delay associated with packet processing within any given network device, etc. By gathering these types of network information for multiple consistently sampled packets in one or more network flows, the collector circuitry and/or other analysis devices, may perform network analysis that identifies inefficient forwarding paths, that identifies inefficiently network connections, that identifies overloaded network devices, that identifies overused device ports, that identifies faulty network equipment, etc., may generate visual representations of the gathered network information for display (e.g., to a user), may provide one or more alerts when one of more corresponding network issues are identified based on the gathered network information, and/or may take any other suitable actions based on the gathered network information.

Network Sampling Policy

Figure 9:
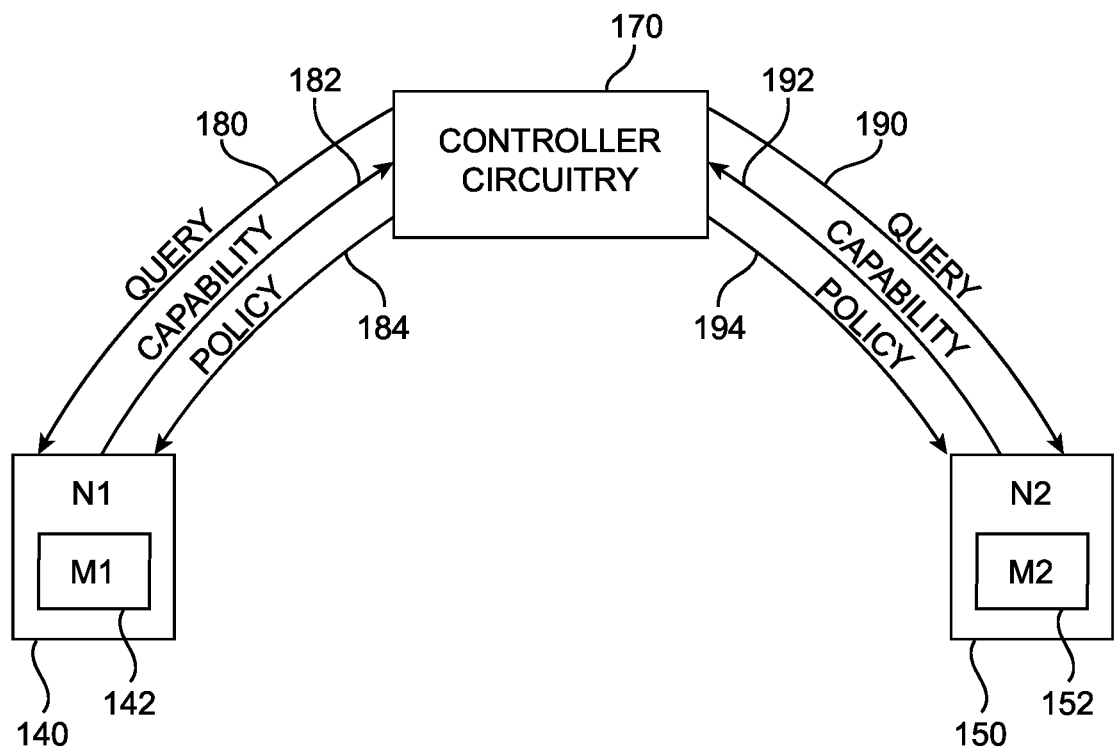
FIG. 9 is a diagram of illustrative controller circuitry configured to provide a consistent sampling policy across multiple network nodes in accordance with some embodiments.

To ensure that network nodes operate consistently to sample the desired set of packets for one or more network flows, controller circuitry controlling the network nodes may provide sampling policies or other policy information to the network nodes. As shown in FIG. 9, controller circuitry 170 (e.g., controller circuitry 18 in FIG. 1) can communicate with one or more network nodes such as network nodes 140 and 150 via one or more network links (e.g., control plane and/or data plane links).

In the example of FIG. 9, controller circuitry 170 queries the capabilities of network nodes 140 and 150 (e.g., steps 180 and 190). In response to the query, network nodes 140 and 150 provide information indicative of their corresponding capabilities (e.g., steps 182 and 192). This capability information may include network node type, circuitry present in the network node, whether or not network node includes a matching engine, a type of matching engine or generally the capabilities of the match engine, a storage capacity of the memory circuitry in the matching engine, etc. If desired, network nodes communicatively coupled to controller circuitry 170 may provide the information indicative of their corresponding capabilities without any specific queries from controller circuitry 170 (e.g., automatically during controller circuitry initialization, when network nodes are coupled and/or discovered by controller circuitry 170, by omitting steps 180 and 190, etc.).

In response to receiving the capabilities information of network nodes 140 and 150, controller circuitry 170 may provide suitable sampling policy information such as a sampling policy based on which network nodes 140 and 150 may generate and store matching table entries for sampling at respective matching engines 142 and 152, etc.

FIGS. 10 and 11 show two illustrative sampling policies 200 and 210. In a first example shown in FIG. 10, sampling policy 200 may include data field information 202 indicative of three data fields, such as source layer 4 port number field (for TCP), destination layer 4 port number field (for TCP), and TCP sequence number field. Sampling policy 200 may also include corresponding information 204 indicative of the matching criteria for each of the three data fields, such as a source port number based on which the source port number in an incoming packet is matched, a destination port number based on which the destination port number in an incoming packet is matched, and one or more bit locations (or range of values) in a TCP sequence number to match and the corresponding values at those bit locations.

Referring to the configuration in FIG. 9, controller circuitry 170 may provide information indicative of the same network policy 200 to network nodes 140 and 150. In response, network nodes 140 and 150 may populate respective memory circuitry in matching engines 142 and 152 with the same corresponding matching table entry associated with policy 200.

Policy 200 may be associated with sampling a subset of packets in a first network flow. By controlling both network nodes 140 and 150 to enforce sampling policy 200, controller circuitry 170 may provide collector circuitry 106 (FIG. 8) with information regarding the same subset of packets for the same network flow.

In a second example shown in FIG. 11, sampling policy 210 may include data field information 212 indicative of two data fields, such as a source IP address field, and an IP packet ID number field. Sampling policy 210 may also include corresponding information 214 indicative of matching criteria for each of the two data fields, such as a source IP address or prefix based on which the source IP address in an incoming packet is matched, and one or more bit locations in an IP packet ID number to match and the corresponding values at those bit locations.

Policy 210 may be associated with sampling a subset of packets in a second network flow. By controlling both network nodes 140 and 150 to enforce sampling policy 210, controller circuitry 170 may provide collector circuitry 106 (FIG. 8) with information regarding the same subset of packets for the same network flow.

The sampling policies of FIGS. 10 and 11 are merely illustrative. If desired, multiple sampling policies may be used simultaneously to match on packets in multiple network flows of interest. If desired, sampling policy enforced by controller circuitry 170 and/or corresponding matching table entries stored at matching engines 140 and 142 may be updated over time to sample different subsets of a same network flow, a subset of different network flows, different subsets of different network flows.

As an example, an initial sampling policy may be too restrictive (e.g., may not provide enough packets within a network flow to the collector circuitry, the sampled subset of packets may be too small for the network flow, etc.) or may be too broad (e.g., may provide too many packets within a network flow to the collector circuitry, the sampled subset of packets may be too large for the network flow). In this example, controller circuitry and/or matching engines may adjust the portion (e.g., the number of bits, the range of values, etc.) of the high entropy data field based on which packets are matched to meet a desired rate of sampling for each sampling policy. More specifically, if the sampling policy is too restrictive, bits at fewer bit locations in the high entropy data field may be matched to sample an increased subset of packets, and if the sampling policy is too broad, bits at more bit locations in the high entropy data field may be matched to sample a decreased subset of packets.

These examples in FIGS. 9-11 are merely illustrative. If desired, controller circuitry may provide sampling policy information for any desired subsets of one or more network flows to any suitable number of network nodes (e.g., all of the network nodes communicatively coupled to the controller circuitry). If desired, the controller circuitry may subsequently provide (e.g., periodically provide) updated sampling policy information to the network nodes as suitable to adjust the packet sampling rate to meet one or more sampling criteria.

Packet Marking for Telemetry

Figure 12:
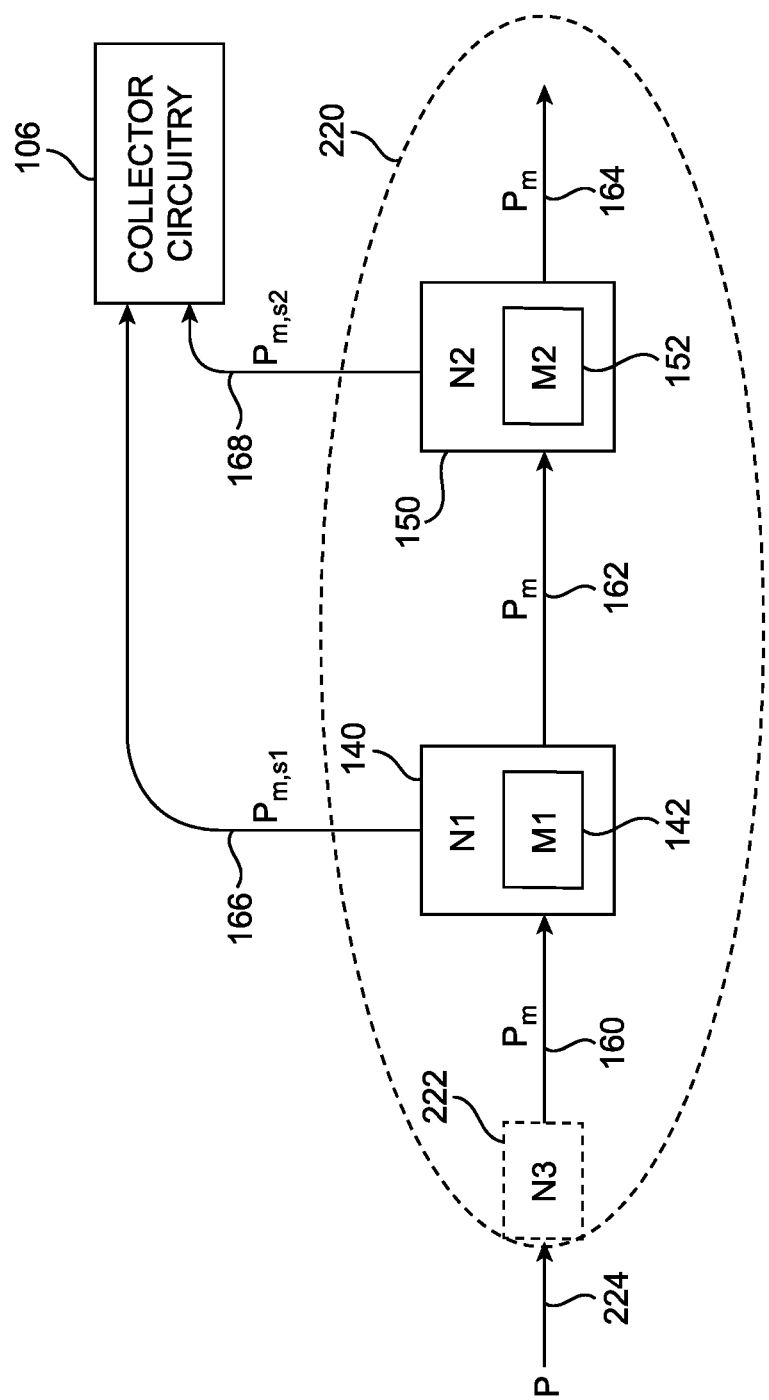
FIG. 12 is a diagram of illustrative network nodes configured to selectively mark a packet and to sample the marked packet in accordance some embodiments.

In some network configurations, it may be suitable for a network to gather telemetry data based on packets that have been selectively marked. In particular, as shown in FIG. 12, packet P may enter a network domain 220 (e.g., the entirety of a network, a portion of a network with client switches controlled by a client server, etc.) via path 224. At an ingress interface of a network device (e.g., network node 222) at the edge of network domain 220, packet P may be marked. In particular, network node 222 may include packet processing circuitry that modifies at least a portion of an unused data field (e.g., a bit at a bit location for a data field that is unused at least in network domain 220) in packet P. Network node 222 may subsequently provide the modified version of packet P (e.g., packet $P_m$) per forwarding operation to a subsequent network node 140 via path 160.

Network node 140 and other network nodes such as network node 150 may match on the modified or marked data field in the network packet (e.g., using a corresponding matching table entry or matching criterion) and sample the marked network packet. As shown in FIG. 12, network node 140 may provide a first sampling of marked packet $P_m$ (e.g., packet $P_{m,S1}$) to collector circuitry 106 via path 166. Network node 150 may provide a sampling of marked packet $P_m$ (e.g., packet $P_{m,S2}$) to collector circuitry 106 via path 168. Marked packet $P_m$ may continue to be forwarded along its normal forwarding path (e.g., paths 162 and 164) as the modified data field is an unused field and does not affect the forwarding operation of packet P (e.g., packet $P_m$ will behave the same manner as packet P during the forwarding operation).

Figure 13:
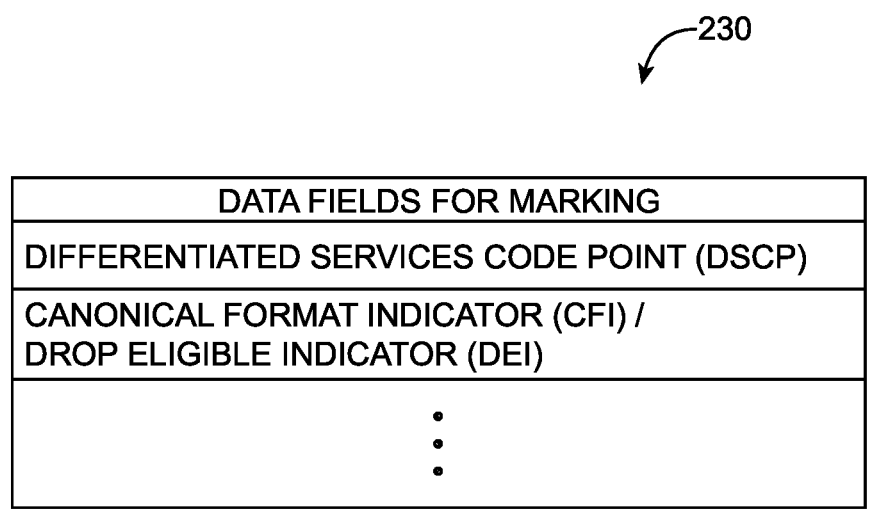
FIG. 13 is a table of illustrative data fields usable for performing a marking operation in accordance with some embodiments.

FIG. 13 shows an illustrative table of data fields 230 for marking. As example, these data fields may include the differentiated service code point (DSCP) field, the canonical form indicator (CFI)/drop eligible indicator (DEI) field, or any other suitable data fields. Referring back to FIG. 12, an edge network device such as network node 222 may update (e.g., set to 0 or set to 1) one or more bits reserved for one of these illustrative data fields to mark a packet. As an example, network node 222 may also include a matching engine that selectively matches on a subset of network packets for one or more network flows and selectively performs the marking operation at a bit location for one of these illustrative data fields (e.g., ensure that the bit location in the matched packet stores a value of '1'). If desired, network node 222 may also check any non-matching packets to ensure that the bit location is not marked (e.g., ensure that the bit location in the non-matched packet stores a value of '0').

The remaining network nodes (and even network node 222) may only have to match on the marked data field (e.g., the bit location for marking) to determine whether or not a given packet should be sampled. In such a manner, all of the packets for sampling may be identified and determined by the edge network device at the ingress edge of a given network domain. If desired, the same marking (at the same bit location of a data field unused in the network domain) may be used for selectively marking packets, even in different network flows. If desired, network node 222 may selectively mark one or more bit locations at one or more unused data fields in the packet in any suitable manner (e.g., randomly without matching at a matching engine, in a predetermined manner, etc.).

In order to provide a consistent sampling policy and provide collector circuitry 106 with information from the same set of network packets, controller circuitry such as controller circuitry 170 (FIG. 9) may communicate with one or more network nodes having ingress interfaces at the edge of network domain 220 to consistently mark a desired (randomized) subset of network packets matching on data fields (e.g., low entropy data fields) associated with each network flow of interest. As an example, these network nodes having ingress interfaces at the edge of network domain 220 may be leaf switches in a spine-leaf network configuration. If desired, controller circuitry 170 may control these edge network nodes to periodically and/or randomly mark packets to provide only a subset of all packets in the network flow. The controller circuitry may also provide all of the network nodes in network domain 220 the same policy to sample any packet matching on the marked data field (e.g., at the marked bit location).

The examples of FIGS. 12 and 13 are merely illustrative. If desired, network domain 220 may include any suitable number of network nodes or devices (e.g., multiple devices at the edge of network domain 220, more than three network nodes, one or more collector circuitry, one or more controller circuitry, etc.). If desired, the sampling scheme based on selective packet marking described in connection with FIGS. 12 and 13 may generate sampled packets annotated with information as similarly described in connection with FIG. 4, may make use of the annotation information as similarly described in connection with FIG. 8, may make use of the sampling policy communicated from controller circuitry as similarly described in connection with FIG. 9.

In general, steps described herein relating to the sampling of network packets and other relevant operations may be stored as (software) instructions on one or more non-transitory (computer-readable) storage media associated with one or more of network nodes (e.g., control circuitry on network switches, packet processing circuitry on network switches), collector circuitry (e.g., control circuitry on collector circuitry), and controller circuitry (e.g., control circuitry on controller circuitry) as suitable. The corresponding processing circuitry (e.g., computing circuitry or computer) for these one or more non-transitory computer-readable storage media may process the respective instructions to perform the corresponding steps.

The foregoing is merely illustrative of the principles of this invention and various modifications can be made by those skilled in the art without departing from the scope and spirit of the invention.

What is claimed is:

1. A method of operating a system containing a first network device having first packet processing circuitry and a second network device having second packet processing circuitry, the method comprising:

configuring the first packet processing circuitry and the second packet processing circuitry to each match at least on a low entropy data field of ingress network packets and at least on a high entropy data field of the ingress network packets, wherein network packets in a given network flow have a fixed value at the low entropy data field and a set of values at the high entropy data field and wherein a sampling policy indicates packet sampling of any network packet having the fixed value at the low entropy data field and a subset of the set of values at the high entropy data field;

sampling, by the first network device, a given network packet in the given network flow at least partly based on a first value of the given network packet at the low entropy data field and a second value of the given network packet at the high entropy data field; and sampling, by the second network device, the given network packet at least partly based on the first value of the given network packet at the low entropy data field and the second value of the given network packet at the high entropy data field.

2. The method defined in claim 1, wherein the subset of the set of values for the high entropy data field is determined at least by a bit value at a corresponding bit location for the high entropy data field, and configuring the first packet processing circuitry and the second packet processing circuitry to each match at least on the low entropy data field of the ingress network packets and at least on the high entropy data field of the ingress network packets comprises configuring the first packet processing circuitry and the second packet processing circuitry to each match at least on the low entropy data field of the ingress network packets and at least on the corresponding bit location for the high entropy data field of the ingress network packets.

3. The method defined in claim 2, wherein the high entropy data field comprises a data field selected from the group consisting of: a layer 4 (L4) checksum field, an Internet Protocol (IP) packet identification field, a Transmission Control Protocol (TCP) sequence number field, a Real-time Transport Protocol (RTP) timestamp field, and an RTP sequence number field.

4. The method defined in claim 3, wherein the low entropy data field comprises a data field selected from the group consisting of: a source IP address field, a destination IP address field, an IP protocol type field, a source L4 port field, and a destination L4 port field.

5. The method defined in claim 1, further comprising:

sending, by the first network device, a first sampled version of the given network packet to collector circuitry external to the first and second network devices; and sending, by the second network device, a second sampled version of the given network packet to the collector circuitry, wherein the first and second network devices respectively include first and second clocks synchronized with each other, the first sampled version of the given network packet includes a first timestamp generated based on the first clock, and the second sampled version of the given network packet includes a second timestamp generated based on the second clock.

6. The method defined in claim 5, wherein the first sampled version of the given network packet comprises information consisting of: an ingress interface of the given network packet at the first network device, an egress interface of the given network packet at the first network device, an ingress time at the first network device, an egress time at the first network device, an identifier for the first network device, and an identifier for the sampling policy.

7. The method defined in claim 1 further comprising:
sending, by the first device, capability information indicative of a capability of the first packet processing circuitry to controller circuitry; and
after sending the capability information, providing the first packet processing circuitry with a sampling table entry for the sampling policy based on which the given network packet is sampled.

8. The method defined in claim 7, wherein sending the capability information comprises sending the capability information in response to a query for the capability information from the controller circuitry.

9. The method defined in claim 7 further comprising:
providing the second packet processing circuitry with the sampling table entry for the sampling policy based on which the given network packet is sampled.

10. The method defined in claim 7, wherein the sampling policy is associated with a first sampling rate of the network packets in the network flow, the method further comprising:
providing the first packet processing circuitry with an updated sampling table entry for an updated sampling policy, wherein the updated sampling table entry contains an updated subset of the set of values at the high entropy data field and wherein the updated sampling policy is associated with a second sampling rate of the network packets in the network flow.

11. The method defined in claim 1, wherein the first packet processing circuitry comprises first ternary content addressable memory circuitry and the second packet processing circuitry comprises second ternary content addressable memory circuitry.

12. One or more non-transitory computer-readable storage media comprising instructions that, when processed by one or more processors, cause the one or more processors to:
identify a sampling policy for sampling network packets in a network flow, the network packets in the network flow having a same source address and a same destination address, wherein the sampling policy indicates a first data field of the network packets that has a same value in each of the network packets in the network flow and wherein the sampling policy indicates a second data field of the network packets that has values that vary across the network packets in the network flow; and
configure a network switch based on the sampling policy to
match the network packets on the first data field and on at least a portion of the second data field,
forward and sample a first subset of the network packets in the network flow based on the same value of the first data field and the varied values of the second data field in the first subset of the network packets, and
forward without sampling a second subset of the network packets in the network flow based on the same value of the first data field and the varied values of the second data field in the second subset of the network packets.

13. The one or more non-transitory computer-readable storage media defined in claim 12 further comprising instructions that, when processed by the one or more processors, cause the one or more processors to:
configure an additional network switch based on the sampling policy to
forward and sample the first subset of the network packets in the network flow based on the values of the second data field in the first subset of the network packets.

14. The one or more non-transitory computer-readable storage media defined in claim 13 further comprising instructions that, when processed by the one or more processors, cause the one or more processors to:
collect a first set of sampled network packets associated with the first subset of the network packets from the network switch;
collect a second set of sampled network packets associated with the first subset of the network packets from the additional network switch; and
identify a forwarding path for each network packet in the first subset of network packets based on the first and second sets of sampled network packets.

15. The one or more non-transitory computer-readable storage media defined in claim 14, wherein the network switch and the additional network switch include respective clocks synchronized with each other, each of the sampled network packets in the first set includes temporal information generated based on the clock at the network switch, and each of the sampled network packets in the second set includes temporal information generated based on the clock at the additional network switch.

16. The one or more non-transitory computer-readable storage media defined in claim 12 further comprising instructions that, when processed by the one or more processors, cause the one or more processors to:
identify capability information associated with the network switch before configuring the network switch based on the sampling policy.

17. A method of sampling network traffic in a network, the method comprising:
receiving a network packet in a network flow at a network node, the network packet having a first value at a low entropy data field and having a second value at a high entropy data field, wherein each network packet in the network flow has the first value at the low entropy data field and the network packets in the network flow have different values at the high entropy data field;
obtaining a matching table containing an entry indicative of at least some of the network packets in the network flow for telemetry, wherein the entry identifies the first value for the low entropy data field and a set of values for the high entropy data field;
determining whether or not to sample the network packet based on matching the first value in the network packet to the first value identified by the entry and matching the second value in the network packet to the set of values identified by the entry; and
in response to a determination to sample the network packet, generating a sample of the network packet at least in part by generating an annotated version of the network packet.

18. The method defined in claim 17, wherein the annotated version of the network packet includes locally meaningful annotations and wherein generating the sample of the network packet is performed at least in part by translating the locally meaningful annotations into globally meaningful annotations.

19. The method defined in claim 18 further comprising: providing the sample of the network packet having the globally meaningful annotations to collector circuitry using a tunneling protocol.

20. The method defined in claim 17 further comprising: generating a plurality of samples of the network packet at corresponding network nodes across the network.

* * * * *